(12) United States Patent
Shortt et al.

(10) Patent No.: US 12,387,513 B1
(45) Date of Patent: Aug. 12, 2025

(54) SYSTEMS, METHODS, AND DEVICES FOR AUTOMATED SELF-LEARNING MACHINE DATA NORMALIZATION, DIGITIZATION, AND EXTRACTION FOR VERIFICATION AND NOTIFICATION

(71) Applicant: Vroom, Inc., New York, NY (US)

(72) Inventors: Thomas Harold Shortt, Islamorada, FL (US); Jeffrey Roger Van Dyke, Nashville, TN (US); Brian John Rogers, Kent, CT (US); Prasoon Kumar Gupta, Alpharetta, GA (US); Stacie Lynn Grueser, Burien, WA (US); Cesar Augusto Aponte, Fort Lauderdale, FL (US)

(73) Assignee: Vroom, Inc., Houston, TX (US)

( * ) Notice: Subject to any disclaimer, the term of this patent is extended or adjusted under 35 U.S.C. 154(b) by 329 days.

(21) Appl. No.: 18/322,269

(22) Filed: May 23, 2023

Related U.S. Application Data

(60) Provisional application No. 63/365,228, filed on May 24, 2022.

(51) Int. Cl.
  *G06V 30/12* (2022.01)
  *G06Q 30/018* (2023.01)
  *G06V 10/70* (2022.01)
  *G06V 30/412* (2022.01)

(52) U.S. Cl.
  CPC ....... *G06V 30/133* (2022.01); *G06Q 30/0185* (2013.01); *G06V 10/70* (2022.01); *G06V 30/412* (2022.01)

(58) Field of Classification Search
  USPC ........................................................ 382/159
  See application file for complete search history.

(56) References Cited

U.S. PATENT DOCUMENTS

2022/0121845 A1* 4/2022 Davidson ........... H04N 1/00037

* cited by examiner

Primary Examiner — Jacky X Zheng
(74) Attorney, Agent, or Firm — Perkins Coie LLP

(57) ABSTRACT

Systems, methods, and devices for automated self-learning machine data normalization, digitization, and extraction for verification and notification are disclosed herein. In some embodiments, a computer-implemented self-learning method for dynamically transmitting electronically a registration authorization request includes accessing an electronic vehicular database to electronically retrieve source data objects, applying an algorithm to the electronically retrieved source data objects, extracting data fields from the source data objects, normalizing the extracted data fields from the source data objects, dynamically selecting a first remotely connected electronic vehicular authorization database, accessing first remotely connected electronic vehicular authorization database-specific vehicular interchange requirements, and electronically transmitting at least one of the electronically retrieved source data objects to the dynamically selected first remotely connected electronic vehicular authorization database based on the source data objects, satisfying the first remotely connected electronic vehicular authorization database-specific vehicular interchange requirements.

20 Claims, 7 Drawing Sheets

*FIG. 3*

SYSTEMS, METHODS, AND DEVICES FOR AUTOMATED SELF-LEARNING MACHINE DATA NORMALIZATION, DIGITIZATION, AND EXTRACTION FOR VERIFICATION AND NOTIFICATION

CROSS-REFERENCE TO RELATED APPLICATIONS

This application claims the benefit of U.S. Provisional Patent Application No. 63/365,228, entitled "SYSTEMS, METHODS, AND DEVICES FOR AUTOMATED SELF-LEARNING MACHINE DATA NORMALIZATION, DIGITIZATION AND EXTRACTION FOR VERIFICATION AND NOTIFICATION," filed May 24, 2022, the contents of which are incorporated by reference herein in their entirety.

TECHNICAL FIELD

The embodiments of the disclosure generally relate to systems, methods, and devices for automated self-learning machine data normalization, digitization, and/or extraction for verification and/or notification, and more particularly to systems, methods, and devices for automatically and dynamically analyzing documents, verifying data information, and generating data reports and outputs.

BACKGROUND

Documentation for vehicle transactions can be extensive and errors can be made in preparing documentation. For example, make, model, model year, vehicle identification number (VIN), mileage, missing signatures, and so forth may be incorrect on one or more documents. In some cases, individuals may prepare fraudulent documentation, for example, in an effort to sell a vehicle that was stolen or that otherwise has significant title problems, or some documents may simply be missing. In some cases, a document may not contain errors but may suffer from other issues such as smudged signatures, blurred text (which can occur, for example, if a user scanned or took a picture of a document for uploading), and so forth. In some cases, there can be errors and other issues present in the same document. Manual review of each and every field in a document can be overly time-consuming and costly. There is a need for a system that can at least partially automate document quality assurance in vehicle transaction settings.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the embodiments described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

In some embodiments, a computing system is configured to perform a computer-implemented self-learning method for dynamically transmitting electronically a registration authorization request based on automatic selection of a remotely connected electronic vehicular authorization database (e.g., a government-run vehicle registration agency).

In some embodiments, the method comprises accessing through an application programming interface (API) an electronic vehicular database to electronically retrieve a plurality of source data objects (e.g., documents) relating to a vehicular interchange. In some embodiments, the vehicular interchange includes a sale, a purchase, and a trade-in of one or more vehicles.

In some embodiments, retrieving the source data objects can be based at least partially on outputs from a rules engine. The rules engine can include any combination of one or more of logic, rules, regulations, procedures, or laws for a plurality of states and/or counties. The rules engine can also include documents required by each of the plurality of states and/or counties.

In some embodiments, the method comprises applying an optical character recognition algorithm or a computer vision algorithm to the electronically retrieved plurality of source data objects to generate a modified plurality of source data objects.

In some embodiments, the method comprises extracting a plurality of data fields from the modified plurality of source data objects, wherein the data fields comprise a vehicle identification number of a vehicle.

In some embodiments, the method comprises normalizing the plurality of extracted data fields from the modified plurality of source data objects using at least one of a universal data representation map and a source data object-specific data representation map.

In some embodiments, the method comprises dynamically selecting a first remotely connected electronic vehicular authorization database from a plurality of remotely connected electronic vehicular authorization databases to electronically transmit over an electronic communications network at least one of the electronically retrieved plurality of source data objects to the first remotely connected electronic vehicular authorization database, wherein the dynamically selecting is based on at least a number of previously electronically transmitted registration authorization requests to the first remotely connected electronic vehicular authorization database, wherein the number of previously electronically transmitted registration authorization requests is electronically stored in a historical database.

In some embodiments, the method comprises accessing first remotely connected electronic vehicular authorization database-specific vehicular interchange requirements electronically stored in a vehicular interchange requirements database.

In some embodiments, the method comprises electronically transmitting over the electronic communications network at least one of the electronically retrieved plurality of source data objects to the dynamically selected first remotely connected electronic vehicular authorization database based on the plurality of source data objects, relating to the vehicular interchange, satisfying the first remotely connected electronic vehicular authorization database-specific vehicular interchange requirements.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

FIG. 3 illustrates an example graphical user interface displaying details and classifications associated with a list of documents that pertain to a particular transaction, thereby providing a clerk with an overview of source data objects relating to a vehicular interchange in accordance with embodiments of the present technology.

DETAILED DESCRIPTION

Figure 1A:
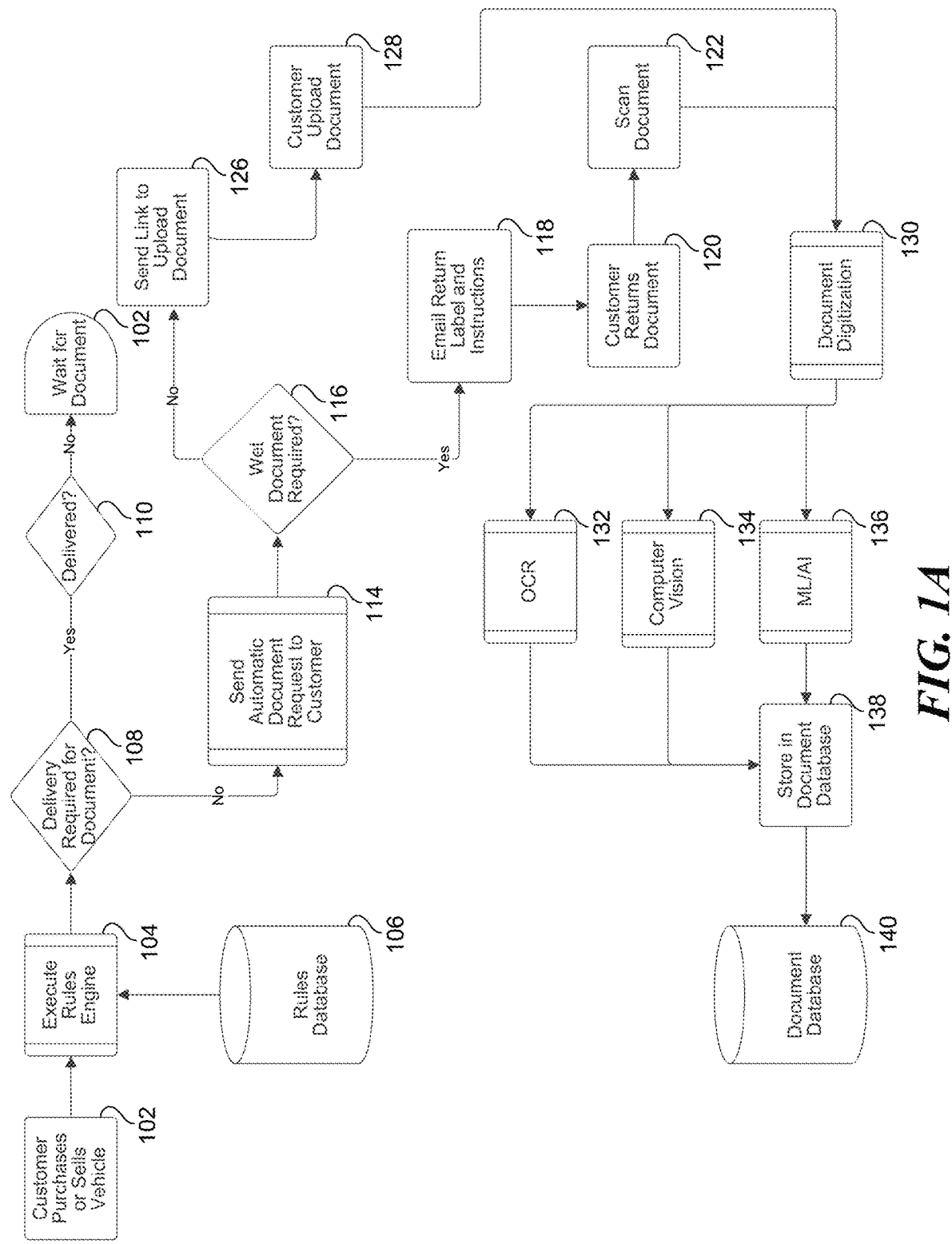
FIGS. 1A and 1B are flowcharts illustrating an example computer-implemented self-learning method for dynamically transmitting electronically a registration authorization request based on automatic selection of a remotely connected electronic vehicular authorization database in accordance with embodiments of the present technology.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

The embodiments of the disclosure generally relate to systems, methods, and devices for automated self-learning machine data normalization, digitization, and/or extraction for document processing, transaction processing, and/or timeline verification and/or notification. Some embodiments herein are directed to a system that may automatically request documents from a user when a vehicle is purchased or sold. The document request can be based at least partially on outputs from a rules engine. The rules engine can include any combination of one or more of logic, rules, regulations, procedures, or laws for a plurality of states and/or counties. The rules engine can also include documents required by each of the plurality of states and/or counties. The request for documents can be based on the rules and documents required by the state or county where the user is located, the state or country where the transaction is to be executed, the location of the vehicle, the state where the vehicle is registered, and so forth. The governing law for a transaction can depend on one or more these locations.

If a state or county requires physical documents for vehicle registration, the system may be able to track down those physical documents by following the chain of possession of the physical documents. In some embodiments, this may be performed via an application programming interface (API) that allows the system to retrieve documents and their associated data from integrated or third-party data sources. The system may automatically digitize physical documents and convert digital documents into a machine-readable format by optical character recognition (OCR). The system can use a computer vision algorithm, a natural language processing algorithm, or both in order to read and extract information from documents. The information extracted from the digitized documents can be entered into a database in a standardized format. The database can be searchable using an API.

The system may use artificial intelligence and machine learning in order to train and update the computer vision algorithm and/or a natural language processing algorithm. The computer vision algorithm and/or the natural language processing algorithm may be trained based on text data and document images reviewed by system administrators. The system may organize documents based on extracted information from the documents. After the information is extracted from the documents, the system may use the computer vision algorithm, the natural language processing algorithm and/or machine learning for quality assurance. The system may use the computer vision algorithm, the natural language processing algorithm, and/or machine learning in order to compare information in the document to information the system expects to be in the document based on a database, or a machine learning or artificial intelligence model. If the information in the document is close to what the system expects, the document may pass quality assurance. If the information in the document is not close to what the system expects the system may alert a clerk for human review.

The clerk may review the document as a second level of quality assurance. If the document does not pass review by the clerk, the system may automatically request new documentation or information from the user. The computer vision algorithm, the natural language processing algorithm and/or machine learning model may be automatically updated based on the results of the quality assurance check by the system and the clerk. In this way, the reliability and accuracy of the computer vision algorithm, the natural language processing algorithm, and/or the machine learning model may be improved overtime. Once all the documents for a transaction have been received by the system and pass quality assurance, the documents may be printed and/or sent to the DMV or other governmental entity or registration automatically by the system and/or manually by the clerk or other personnel.

Automated Title and Registration

The present disclosure is directed to systems for at least partially automating document quality assurance. In some embodiments, the system may include a rules engine. The rules engine may include a database or vault of documents required to complete a transaction. In some embodiments, the rules engine may include laws, regulations, or rules for transferring title and registration and/or completing the motor vehicle purchase with a DMV or other state or county entity. For example, some states or counties may require documents be submitted with a wet signature. The rules engine may be organized by a location of a user, e.g., state and/or county of a residence of the user, and/or by a transaction type. The transaction type may depend on whether the user purchases or sells a motor vehicle, the type of motor vehicle and/or whether the transaction is financed through the dealer, financed through the user's bank, a cash transaction, etc.

In some embodiments, a user may purchase a motor vehicle. In some embodiments, the user may sell a motor vehicle. The system may access the rules database based on information associated with the user, such as a location of the user. In some embodiments, the user may enter information relevant to the location, such as an address. In these embodiments, the system can use the address to determine which state and/or county to search for in the rules engine. In other embodiments, the system can automatically detect the user's location based on an IP address, a MAC address, a location retrieved from a user device, where the VIN is currently registered, or any other location information. The system can automatically and dynamically retrieve from the database the correct rules and/or documents required for the motor vehicle registration or transaction for the location of the user.

In some embodiments, the system may automatically send a document request to the user. The system may send the document request via mail, email, mobile application, computer application, web application or third-party courier. In some embodiments, the system may require delivery of the motor vehicle prior to the system sending the document request to the user. In these embodiments, the system may automatically and dynamically check for motor vehicle delivery. If the motor vehicle is not delivered, the system may wait until the motor vehicle is delivered before sending the document request to the user. The system may check for motor vehicle delivery at a time interval of about 1 s, about 5 s, about 10 s, about 20 s, about 30 s, about 1 min, about 5 min, about 10 min, about 30 min, about 1 hour, about 2 hours, about 3 hours, about 4 hours, about 5 hours, about 6 hours, about 7 hours, about 8 hours, about 9 hours, about 10 hours, about 12 hours, about 16 hours, about 1 day, about 2 days, about 3 days, about 4 days, about 5 days, about 6 days, about 7 days, about 8 days, about 9 days, about 10 days, and/or any value between the aforementioned values.

In some embodiments, the location of the user may require a physical signature or wet-signed document from the user. In these embodiments, the documents may be sent to the user by mail or the third-party courier. In some embodiments, a return label may be delivered with the documents. In these embodiments, the system may include an application programming interface (API). The API may be configured to automatically retrieve information from or communicate with a third-party API. The API may allow the system to track a chain of possession or location of the documents based on a shipping number or other information associated with the return label through the third-party API. The system may be configured to send an alert to the user and/or a system administrator when the system receives the documents from the user. The system or the system administrator may scan the wet documents or documents with a physical signature in order to digitize the documents. In some embodiments the system or the system administrator may file the wet documents or documents with a physical signature in a physical file.

In some embodiments, a local government associated with the location of the user may allow submitted documents to be digital documents or include a digital signature. In these embodiments, the system may include an API for receiving documents from the user. The user may be provided with a link to upload completed documents. In some embodiments, the user may provide information associated with the user or the transaction in order for the system to organize the documents provided by the user.

In some embodiments, after a digital document is received by the system, or a physical document is digitized, the system may automatically and dynamically organize the document. In some embodiments, the system may include optical character recognition (OCR), a computer vision algorithm, and/or a natural language processing algorithm to automatically convert digital documents into a standardized machine-readable format. In some embodiments, the system may automatically extract information and/or text from an OCR document and store the information and/or text in a standardized searchable database. In some embodiments, the information and/or text may include a document title, a VIN associated with the motor vehicle, a make of the motor vehicle, a model year of the motor vehicle, a model of the motor vehicle, and/or a body type of the motor vehicle. In some embodiments, the system can automatically and dynamically generate or determine coordinates associated with extracted the information and/or text. The standardized searchable database may be accessed by the system administrator through an API. The system may organize the documents by a user's name, a transaction number, the VIN associated with the motor vehicle, and/or any other transaction identifier. In some embodiments, a system administrator or the user may provide the system with one or more of the user's name, the transaction number, the VIN associated with the motor vehicle, tracking number, third party tracking number, and/or any other transaction identifier. In some embodiments, the system may use a computer vision algorithm, a natural language processing algorithm machine learning and/or artificial intelligence to automatically and dynamically read the document to determine the user's name, the transaction number, the VIN associated with the motor vehicle, and/or any other transaction identifier. The computer vision algorithm and/or the natural language processing algorithm may be trained to recognize the document type, automatically label the document, and know where on the document to look for transaction identifier information. The computer vision algorithm and/or the natural language processing algorithm may be trained based on human reviewed documentation. The computer vision algorithm and/or the natural language processing algorithm may compare the document to the human reviewed documentation in order to determine which information to read and extract from the document. In some embodiments, the system may organize the document in a document database based on the document type and the transaction. The document database may include documents from a plurality of transactions.

In some embodiments, the system may automatically read the document for a quality assurance check. The system may read each document when each document is entered into the document database, or the system may wait until every document for a transaction is in the database. The system may use computer vision, the natural language processing algorithm, artificial intelligence, and/or machine learning in order to perform quality assurance. The computer vision algorithm, and/or the natural language processing algorithm may be trained to automatically and dynamically determine based on the document type and the rules engine, which information must be provided on the document, and where the information should appear on the document. The system may be configured to pass or reject the document based on a quality assurance score. The quality assurance score may be based on how similar the information on the document is compared to what the system expects the information should be based on the rules engine, the transaction and previous transactions.

In some embodiments, if the quality assurance score is below a passing threshold, the system may automatically determine whether or not the quality assurance score is within a passing range or within bounds of a potential pass. If the quality assurance score is within the passing range, the document may be sent to a clerk. The clerk may review the document in order to perform the quality assurance check and pass or reject the document. If the clerk rejects the document or the quality assurance score is not within the passing range, the system may automatically send a document request to the user. The document request may include a request for the user to provide missing information or refill out the document. The document request may provide the user with information on how to correct errors in a previously submitted document. In some embodiments, the system may use machine learning to automatically and dynamically update the computer vision algorithm and/or the natural language processing algorithm based on the quality assurance score, and whether or not the clerk passes or rejects the document.

If the clerk passes the document or the quality assurance score is above the passing threshold, the system may automatically and dynamically access the document database in order to determine whether or not every required document for the transaction is in the document database. If one or more documents are not in the document database, the system may periodically access the database until every required document is in the document database. The system may access the document database at a time interval of about 1 s, about 5 s, about 10 s, about 20 s, about 30 s, about 1 min, about 5 min, about 10 min, about 30 min, about 1 hour, about 2 hours, about 3 hours, about 4 hours, about 5 hours, about 6 hours, about 7 hours, about 8 hours, about 9 hours, about 10 hours, about 12 hours, about 16 hours, about 1 day, about 2 days, about 3 days, about 4 days, about 5 days, about 6 days, about 7 days, about 8 days, about 9 days, about 10 days, and/or any value between the aforementioned values.

In some embodiments, the rules engine may include one or more threshold periods. The threshold period may be a date or a period of time, for example two weeks from a date of purchase, when the system must have certain documents from the user in order to submit the documents to a DMV, or third-party quality control vendor, on time. If the system accesses the document database and one or more documents are missing, the system may send an additional request for completed documents to the user and send alerts or reminders periodically to the user that the documents must be submitted by the threshold period. In some embodiments, the system may alert or notify the system administrator of a threshold period. In some embodiments, the system may send alerts to the system administrator or user more frequently as the threshold period approaches. For example, if the threshold period is 2 weeks away, the system may send alerts once every day, however, if the threshold period is 3 days away, the system may send alerts once every 6 hours.

In some embodiments, when the system accesses the database and every required document for the transaction is in the database, the computer vision algorithm, and/or the natural language processing algorithm may again read every document for a second quality assurance check. If the quality assurance score is below a second passing threshold, one or more of the documents may be sent to the clerk to repeat the quality assurance check on the one or more documents.

If the user purchases the motor vehicle, and the documents pass the second quality assurance check, the system may inform the clerk which documents to retrieve from the physical file. The system may automatically print the documents not in the physical file, and an associated registration label. The system or the clerk may place the documents and the registration label in a submission file. In some embodiments the system or the clerk may send the submission file to a DMV associated with the user's location, or a third-party vendor.

If the user sells the motor vehicle, a title associated with the vehicle and/or the transaction may be identified as negotiable if there are no disqualifying issues with the title. In some embodiments, the system may use the documents in the database, and the title associated with the vehicle to automatically update a database of motor vehicles listed for sale. In some embodiments, the system may use the documents in the database, and the title associated with the vehicle when a second user purchases the vehicle. The system may use the documents in the database and compare the documents to corresponding and/or related documents provided by the second user to ensure information provided by the second user passes the quality assurance check.

In some embodiments, a seller may attempt to sell a car with one or more title defects or issues that may affect the dealer's ability to transfer good and marketable title to a subsequent purchaser. If a system detects any such title defects or issues, the system may mark the document as rejected or alert the dealer to conduct a manual review. In such cases, a system also may (i) recommend potential solutions for curing the title defect or issue, or (ii) recommend that the vehicle be sold through an alternate channel, such as wholesale or for scrap metal. If a system detects signs of fraud on a title or in the transaction, then such system may notify the dealer and the appropriate authorities. In some embodiments, the computer vision algorithm, the natural language processing algorithm, and/or the machine learning model may be automatically updated based on the results of the quality assurance check by the system and/or the clerk. In this way, the reliability and accuracy of the computer vision algorithm, the natural language processing algorithm, and/or the machine learning model may be improved overtime. Advantageously, the systems and methods described herein can be used to detect title defects and signs of fraud with better accuracy than is seen with entirely manual processes.

Document Classifier

Sales transactions can involve a wide variety of documents. When a document is received from a buyer or a seller, it can be important to identify that type of document, for example to aid in determining which documents have been received and which are still outstanding, to determine what information should be extracted from the document, the determine how the information should be stored, and so forth.

Examples of documents that can relevant in an automotive sales transaction can include, for example and without limitation, insurance documents, retail purchase agreements, the front of the title, the back of the title, the front of the driver's license, that back of the driver's license, power of attorney, application for a certificate of title, vehicle registration, county of title issuance, application for title, emissions/smog testing results/certification, gap insurance coverage, odometer disclosure, agreement to furnish insurance, a request for dealer funding, a credit application, a limited warranty with or without roadside assistance, an air pollution control statement, a lien release, a bill of seal, a damage disclosure, a service protection contract, a buyer's guide, delivery fee documents, a reassignment of title, details about a decision, an installment sales contract, a cashier's check, a personal check, a VIN inspection report, a weight slip, a "one and the same" certificate (which can be used, for example, when the name on an ownership document does not match the signature), payoff verification, dealer's reassignment of title, gate pass, statement of facts, book transfer, offsite vehicle release, pre-owned certification and inspection report, payment details, sales tax, sales tax exemption, equity disclosure, change of address, articles of incorporation, social security card front, social security card back, proof of income, proof of residence, property tax statements, and so forth. Depending on the location of the transaction, the type of vehicle, any title issues, and so forth, there can be more, fewer, or different documents.

Given the wide variety of documents that can be submitted and the differing requirements for transactions in each state, it can be especially important to verify and ensure, via an at least partially automated system, the completeness and accuracy of the documents in satisfying a particular jurisdiction's transaction requirements.

Source Data Object Processing

Figure 1B:
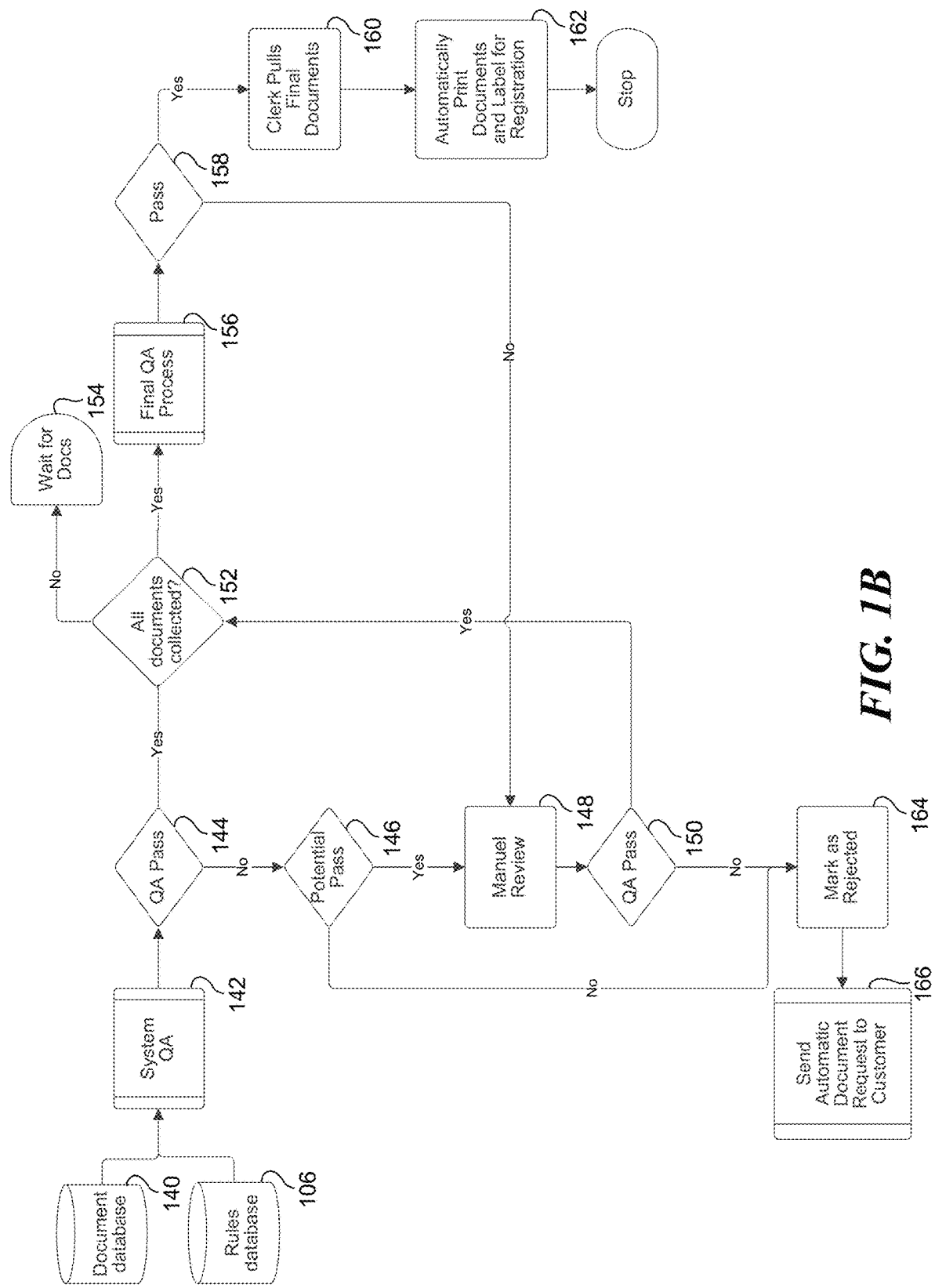

FIGS. 1A and 1B are flowcharts illustrating an example computer-implemented self-learning method for dynamically transmitting electronically a registration authorization request based on automatic selection of a remotely connected electronic vehicular authorization database in accordance with embodiments of the present technology. It is appreciated that the computer-implemented self-learning method may include fewer, more, or alternative processes than illustrated in the flowchart. In some embodiments, the remotely connected electronic vehicular authorization database can include an electronic database of a government-run vehicle registration agency, such as a state's Department of Motor Vehicles (DMV), that stores various information regarding vehicle registration, drivers' licenses, etc. in a particular jurisdiction.

Referring first to FIG. 1A, at block 102, a customer can purchase or sell a vehicle. At block 104, a system can be configured to execute a rules engine. The rules engine can retrieve rule information from rules database 106. As described above, the rules database 106 can include information about relevant rules for completing a vehicular exchange (e.g., a purchase and/or sell transaction, including trade-in vehicles), such as required documents, time limitations, and so forth. At decision point 108, the system can determine if a plurality of source data objects (e.g., purchase documents) needs to be delivered to the customer. For example, in some circumstances, there may be a need to provide a document to the customer. The document can be a physical document or a digital document. If a delivery is required, then at decision point 110, the system can determine if the document has been delivered to the customer. For example, if a document was emailed or made available in an online portal, the system can identify the document as delivered once the document is available for access by the customer. In the case of a physical document, the system can be configured to query external data sources, for example querying a delivery service provider data source using a tracking number to determine if the physical document has been delivered to the customer. At delay 112, the system can wait until the document is delivered to the customer.

If, at decision 108, delivery of the document is not required, the system can, at process 114, automatically send a request for the document to the customer. The document can be a document that the customer already has or needs to obtain elsewhere, such as proof of insurance. At decision 116, the system can determine if a physically signed ("wet") document is required. For example, some states or counties may require a physically signed document to complete a transaction. If a wet document is required, then at block 118, the system can provide a return label and instructions to the customer, for example via email, a web portal, physical mail, etc. At block 120, the customer can return the document. At block 122, the returned document can be scanned and transmitted to an electronic vehicular database. If, at decision 116, a physically signed document is not required, the system can, at 126, provide a link (e.g., via email, via a web portal, etc.) to upload the document. At block 128, the customer can upload the document to the electronic vehicular database, for example via a web portal or by emailing the document.

The computing system can access, through an application programming interface (API), the electronic vehicular database to electronically retrieve the plurality of source data objects relating to a vehicular interchange. In some embodiments, the vehicular interchange includes a sale, a purchase, and a trade-in of one or more vehicles. At process 130, the document can be digitized. Various methods can be used to analyze and/or extract information from the document. For example, the computing system can apply an optical character recognition algorithm 132, a computer vision algorithm 134, and/or a machine learning/artificial intelligence (ML/AI) process 136 to the electronically retrieved plurality of source data objects to generate a modified plurality of source data objects. In some embodiments, the system may use third-party services (e.g., Amazon Web Services) to extract data. At block 138, the document and/or information extracted from the document can be stored in document database 140.

The example document processing can continue as shown in FIG. 1B. At block 142, a system quality assurance ("QA") process can retrieve information from the document database 140 and the rules database 106. The system QA process can compare the received document against rules from the rules database 106 to determine whether or not the document is acceptable. At decision 144, if the document does not pass the system QA process 142, the system can, at decision 146, determine if the document could potentially pass QA. For example, if the right type of document was uploaded but the system was unable to automatically verify signatures, a notary seal, a VIN, etc., the document could pass. In such cases, at block 148, a manual review can be conducted. At decision 150, if the document is fails manual quality assurance, the system can mark the document as rejected at block 164 and the system can send a document request to the customer at process 166 (which, in some embodiments, can be the same as or similar to the process 114).

If, at decision 144 or decision 150, the document passes quality assurance, at decision 152 the system can determine if all required documents have been received. If not, the system can wait for additional documents at block 154. If all the documents have been received, the system can perform a final quality assurance process at process 156. At decision 158, the system can determine if the documents pass the final quality assurance process. If not, the system can send documents for manual review at block 148. If the document fails manual review at decision 150, the document can be rejected at block 164 and a request can be provided to the customer to resubmit the document at process 166.

After all documents have passed the final quality assurance process 156, a clerk can pull the final documents at block 160. The documents can, at block 162, automatically be printed and a label can be provided so that registration of the vehicle can proceed. In some embodiments, when a customer sells a vehicle, after the final quality assurance process is complete, the title of the vehicle is marked as negotiable instead, indicating that the vehicle has a clean title suitable for sale.

Data Extraction

Figure 2:
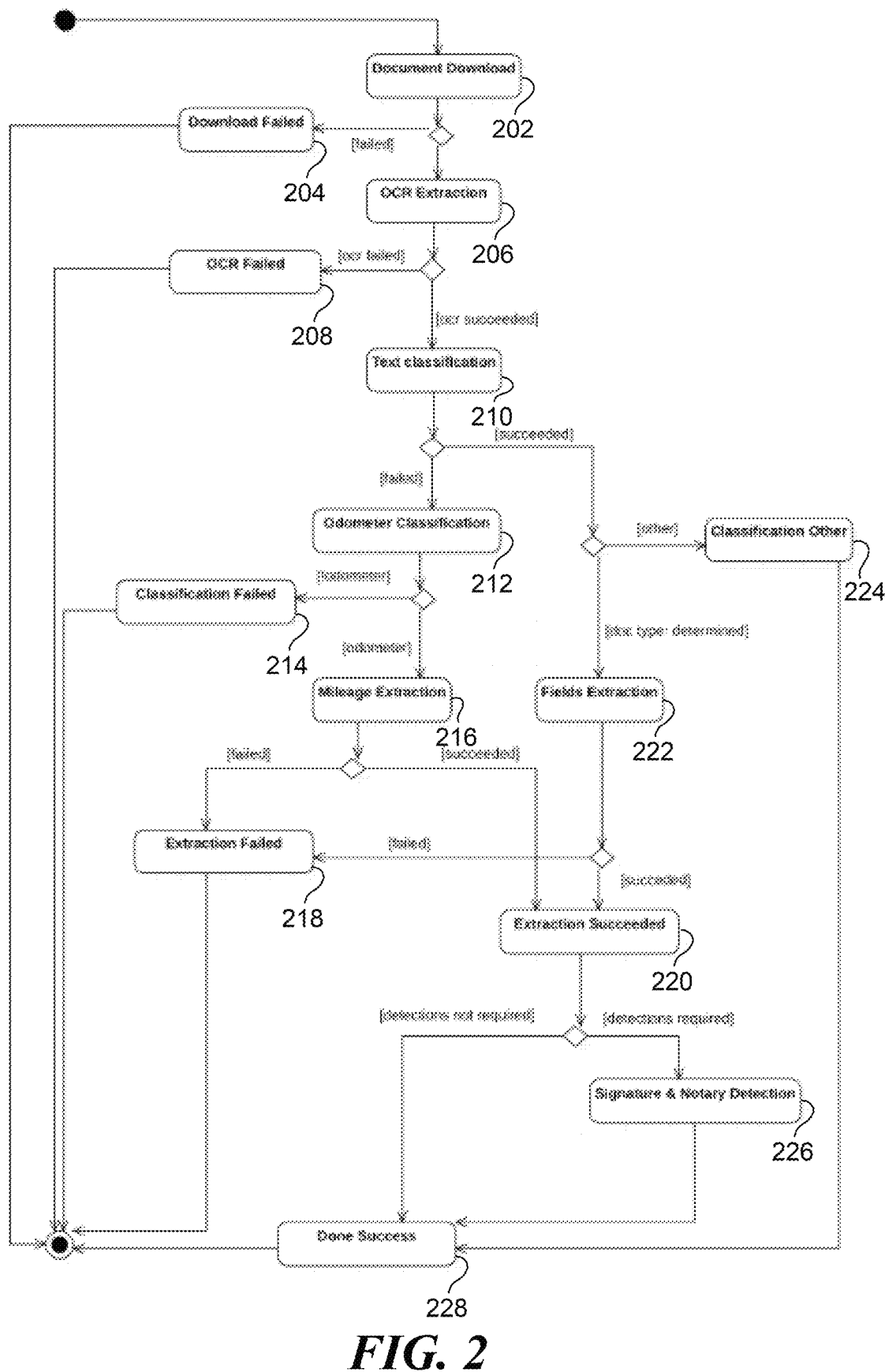
FIG. 2 is a flowchart illustrating an example computer-implemented self-learning method for dynamically transmitting electronically a registration authorization request based on automatic selection of a remotely connected electronic vehicular authorization database in accordance with embodiments of the present technology.

FIG. 2 is a flowchart illustrating an example computer-implemented self-learning method for dynamically transmitting electronically a registration authorization request based on automatic selection of a remotely connected electronic vehicular authorization database in accordance with embodiments of the present technology. It is appreciated that the computer-implemented self-learning method may include fewer, more, or alternative processes than illustrated in the flowchart.

After a document is submitted, in addition to determining the type of source data object (e.g., a document) submitted, it can be important to extract information from the document. In some embodiments, the flowchart shown in FIG. 2 is an example of the document digitization process 130 illustrated in FIG. 1A.

At process 202, the computing system may download the document from storage or database. In some embodiments, the system may use xml and/or APIs to transfer documents to and from the database and/or the system. The download may fail per process 204, but if the download is successful, the system may proceed to process 206 to perform optical character recognition (OCR) on the document to extract a plurality of data fields from the modified plurality of source data objects. For example, the OCR process can extract the text from a document, and the extracted text can be run through a parser that can be configured to apply a collection of rules to extract information. For example, a parser can be configured to extract a VIN from a received document. In some cases, a system can parse information directly from the document, such as make, model, year, and so forth. In some embodiments, some information can be extracted and other information can be computed. For example, in North America, the VIN can include a world manufacturer identifier, vehicle attributes, model year, plant code, a check digit, and a sequential number. VINs in other regions or countries can include more, less, or different information. In some embodiments, the extracted information can be store as key-value pairs (e.g., VIN: 11111111111111111) where VIN is the key and 11111111111111111 is the value.

OCR can work well for extracting information from documents, but there can be limitations and the OCR may fail or be incomplete per process 208. For example, OCR may not be able to extract a signature, notary stamp, and so forth. Accordingly, in some embodiments, an object detection model can be configured to detect objects of interest in a document. For example, an object detection model can be trained to recognize signatures, to recognize notary stamps, and so forth. In some embodiments, a rules database or other data store can include information such as whether or not notarization is required, the number of signatures expected to be present on a particular form, and so forth. In some embodiments, requirements can vary from transaction to transaction. For example, if a car is owned by two people instead of one, there may be two signatures on a document instead of one. Similarly, if a vehicle is being purchased by someone with the use of a cosigner, there may be two signatures present, while there may be only a single signature if the buyer is purchasing the vehicle without the use of a cosigner. Thus, in some embodiments, a system can consider details of the transaction, state or county legal requirements, and so forth to evaluate whether the expected number of signatures for the particular transaction are present.

If OCR has succeeded, the system may proceed to process 210 and perform text classification. In some embodiments, the computing system can classify he electronically retrieved plurality of source data objects based on the normalized plurality of data fields. If text classification fails, the system may proceed to odometer classification per process 212. The odometer classification may fail per process 214, but if successful, the system can extract mileage information at process 216. If the text classification at process 210 did succeed, the system may use fields extraction at process 222 or another classification model at process 224. The mileage and/or fields extraction at processes 216 and 222, respectively, may fail (process 218) or succeed (process 220). Upon successful extraction, the system may deem that detections are not required and conclude (process 228). If the system deems that detections are required, the system may proceed to process 226, during which the system detects signatures and/or notarization, before concluding.

Document Quality Assurance

In some embodiments, the computing system can search for (1) missing data fields in the electronically retrieved plurality of source data objects, wherein the missing data fields are based at least on the first remotely connected electronic vehicular authorization database-specific vehicular interchange requirements, and (2) title defects, issues or evidence of fraud in the electronically retrieved plurality of source data objects. In some embodiments, the first remotely connected electronic vehicular authorization database-specific vehicular interchange requirements can include various requirements pertaining to a vehicular sale or transaction in a particular jurisdiction, such as the types of documents or information that need to be submitted to a vehicular authorization unit. In some embodiments, the computer-implemented self-learning method can include, for example, verifying make, model, year, mileage, VIN, and/or other information about the vehicle. The quality assurance can include, for example, information relating to the seller or purchaser, such as name, address, date of birth, social security number, driver's license number, and so forth. In some embodiments, the computer-implemented self-learning method can include, for example, identifying signatures or various information made or entered in the wrong location on the document. In some embodiments, the computer-implemented self-learning method can include ensuring that no information is missing. In some embodiments, the computer-implemented self-learning method can comprise applying one or more rules from a rules database (e.g., rules database 106). In some embodiments, the extracted data can be compared to reference sources such as government databases, privately-owned databases (e.g., consumer credit databases), and so forth. In some embodiments, the extracted data can be compared to data extracted from other documents submitted by the customer. For example, if a customer has previously uploaded registration information and then uploads insurance coverage information, the system can check that the VIN provided on the registration document is the same as the VIN indicated on the insurance coverage information. In some embodiments, the system can utilize AI and/or ML to automatically detect issues in documents.

In some embodiments, if the system detects title defects, issues or signs of fraud, the system can flag such defect, issue or signs of fraud, the type of document, and the transaction as a whole such that the transaction can be rejected, corrected or sold through an alternate channel. If a system detects signs of fraud on a title or in the transaction, then such system may notify the dealer and the appropriate authorities. In some embodiments, if the system detects fraudulent documentation, the system can alert or arrange for removal of the vehicle(s) associated with the fraud from an inventory. In some embodiments, if the system detects fraudulent documentation, the system can prevent the user associated with the fraudulent documentation from proceeding further in the automobile sale transaction until further review or conclusively. In some embodiments, the system can automatically determine fraud if, for example, there is evidence detected that a document has been tampered with, altered, and/or otherwise made illegitimate and is being used for profit and/or identity theft (e.g., a customer is trying to sell a stolen vehicle). In some embodiments, the system can be trained to distinguish between alterations/evidence that amount to fraud and alterations/evidence that do not.

In some embodiments, the system can check for alternations such as crossed-out text (e.g., dates) and/or write-overs, a signature count of signatures accounted for, presence of notarization and/or wet signatures, VIN, etc. In some embodiments, the system can analyze the document content to determine if the correct document is being used. In some embodiments, the system can distinguish between physical (scanned) and digital documents, such as by looking at the document's meta data. In some embodiments, upon comparing data fields in the document to data stored in a database, the system may require an exact match for some fields (e.g., VIN, insurance policyholder name) but not for others (e.g., addresses may have varying abbreviations, names may omit middle names).

Some documents may have data entries in a decision column (indicating what the customer actually received) and an application column (indicating what the customer applied for). In some embodiments, the system may prioritize extracting data from the decision column, and extract data from the application column only for certain information (e.g., mileage). In some embodiments, the system may automatically verify a data field even if there is a slight discrepancy (e.g., the financed amount may differ slightly, but may be verified as long as the amount is in line with the lienholder's rules).

In some embodiments, the computing system may normalize the plurality of extracted data fields from the modified plurality of source data objects using at least one of a universal data representation map and a source data object-specific data representation map. For example, documents may originate from the customer or another entity, such as the government, which may have varying document structures. In some embodiments, the universal data representation map can include examples of data representation that may be considered or made generally universal, such as addresses. The universal data representation map can be used when a user or the system determines that the table can be used for a large number of different documents without causing issues for too many documents. In some embodiments, the source data object-specific data representation map can include examples of data representation that may be specific to a particular document or transaction (e.g., acronym of a vehicle model). The source data object-specific data representation map can be used when a user or the system determines that the table may cause issues for a large number of documents if used universally. In some embodiments, the computing system can be configured to learn certain data representations (e.g., acronyms) and determine whether it would be appropriate for the universal data representation map or the source data object-specific data representation map.

In some embodiments, the computing system may dynamically select a first remotely connected electronic vehicular authorization database (e.g., a government-run vehicle registration agency) from a plurality of remotely connected electronic vehicular authorization databases to electronically transmit over an electronic communications network at least one of the electronically retrieved plurality of source data objects to the first remotely connected electronic vehicular authorization database, wherein the dynamically selecting is based on at least a number of previously electronically transmitted registration authorization requests to the first remotely connected electronic vehicular authorization database, wherein the number of previously electronically transmitted registration authorization requests is electronically stored in a historical database. In some embodiments, the computing system may further access first remotely connected electronic vehicular authorization database-specific vehicular interchange requirements electronically stored in a vehicular interchange requirements database.

For example, some jurisdictions may require wet signatures on certain documents, and the system may automatically check if a wet signature is present on those documents and, if there is one, whether it is sufficient for the jurisdiction to accept it. In another example, some jurisdictions may require notarization of certain documents, and the system may automatically check whether a document has been notarized or not. In yet another example, a system may not need to verify certain information depending on the jurisdiction, such as in jurisdictions in which the insurance need not be from that particular jurisdiction. In some embodiments, the computer-implemented self-learning method includes assigning a confidence score to a field, representing the estimated probability that the field will satisfy a particular requirement. In some embodiments, the system can be trained to create more accurate confidence scores. In some embodiments, the system may flag that a document form (e.g., template) should be changed, or change the document form automatically, upon determining that the particular document form yields low confidence scores frequently. For example, if the system repeatedly determines that the signatures of two individuals (e.g., including a co-signer) are too close to each other on a particular document form, the system may recognize and indicate that the signature blocks on that particular document form should be spaced farther apart.

In some embodiments, the system identifies one or more aspects relevant to the vehicle transaction (e.g., who the customer is, where the customer is located, when the customer intends to complete the sale) and then determines along a decision tree which processes (e.g., jurisdiction-specific processes) to use. For example, the system may use different processes for when a customer intends to make a trade-in (i.e., simultaneously sell and buy a vehicle) or when there is a co-buyer (e.g., each individual may need to submit a driver's license). In some embodiments, different documents may have different rules for verification. Different lienholders (e.g., banks) may also have different rules that the system may incorporate into the computer-implemented self-learning method.

In some embodiments, the dynamically selecting can be further based on at least an average vehicular interchange period associated with the first remotely connected electronic vehicular authorization database, a reduction in inventory and overhead costs associated with the first remotely connected electronic vehicular authorization database, the vehicle model, pricing, etc. In some embodiments, the system facilitates ad hoc workflow by managing vehicle transition from one consumer to another consumer. In some embodiments, the system may determine that one jurisdiction may have a slow turnaround at a given time (e.g., experiencing throughput issues), and opt to process a deal in a different jurisdiction based on supply and demand for such transactions. For example, a jurisdiction may have a relatively long processing time between buying and selling a vehicle, which can increase costs associated with holding onto vehicles in inventory, overhead costs, etc. Therefore, although an alternative jurisdiction may have higher base costs (e.g., fees), this can be offset by the reduction in processing time, inventory costs, overhead costs, etc.

Manual Review

After the system has automatically extracted and verified certain data fields from documents, there may still be documents and/or certain data fields that need to be verified manually. In some embodiments, the clerk may choose to manually review documents regardless of what data the system has automatically extracted and verified. The system may guide the clerk through each step of the transaction, such as by prompting the clerk to verify a document or data field one at a time in sequence.

Figure 3:
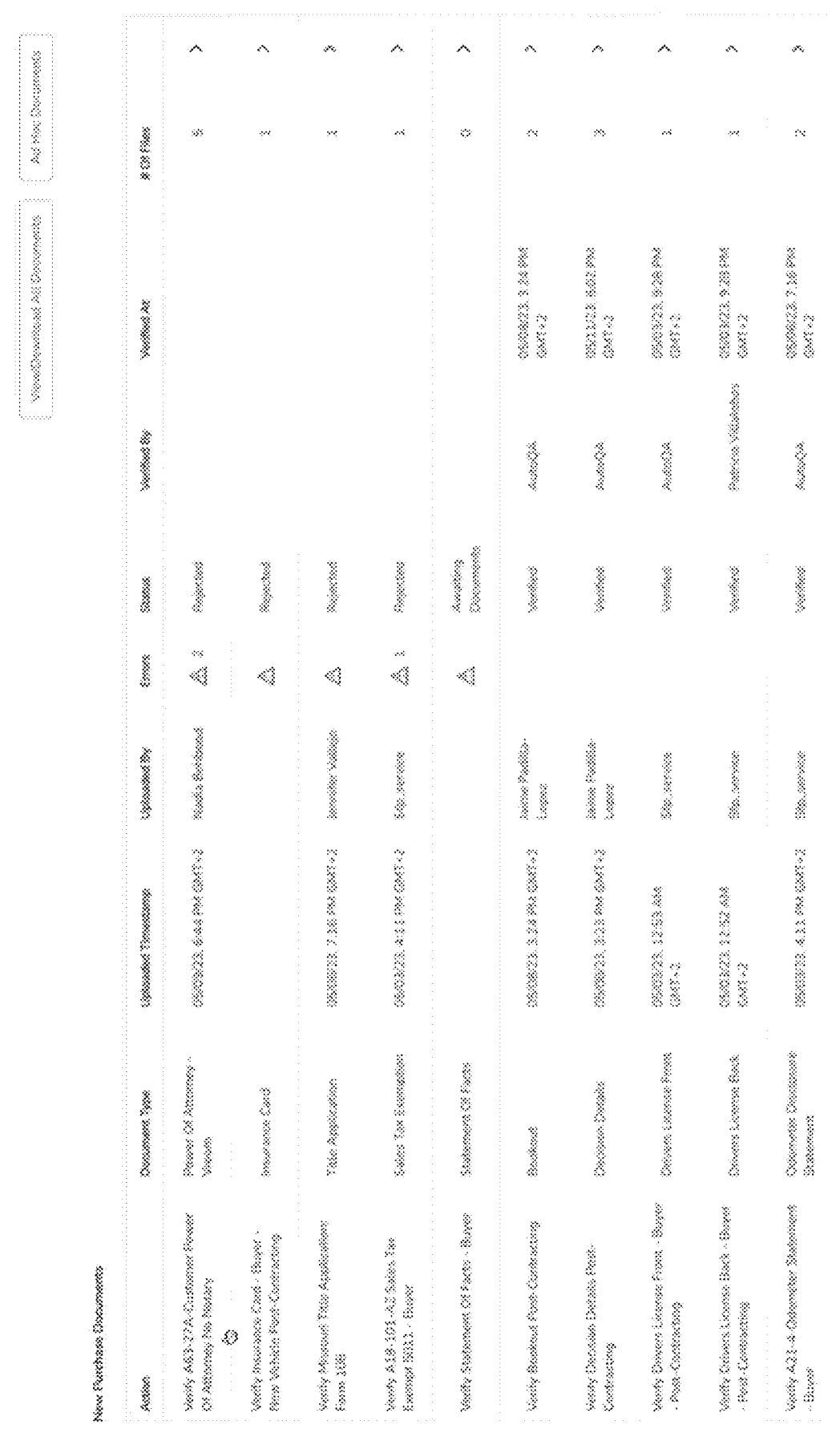

FIG. 3 illustrates an example graphical user interface (GUI) displaying details and classifications associated with a list of documents (e.g., purchase documents) that pertain to a particular transaction, thereby providing a clerk with an overview of source data objects relating to a vehicular interchange in accordance with embodiments of the present technology. In some embodiments, the documents may be categorized based on their classification (e.g., funding details, taxes and fees, vehicle, customer information). In some embodiments, the GUI shows documents that were rejected by the computer-implemented self-learning method or otherwise needing attention to the top of the list of documents for easier access (e.g., marked with an error symbol). In some embodiments, the clerk can click on a document in the list in order to drill down and view more details associated with that particular document or even to view the document itself. In some of such embodiments, the additional details associated with a particular document may be presented via a GUI similar to the one depicted in FIG. 4.

Figure 4:
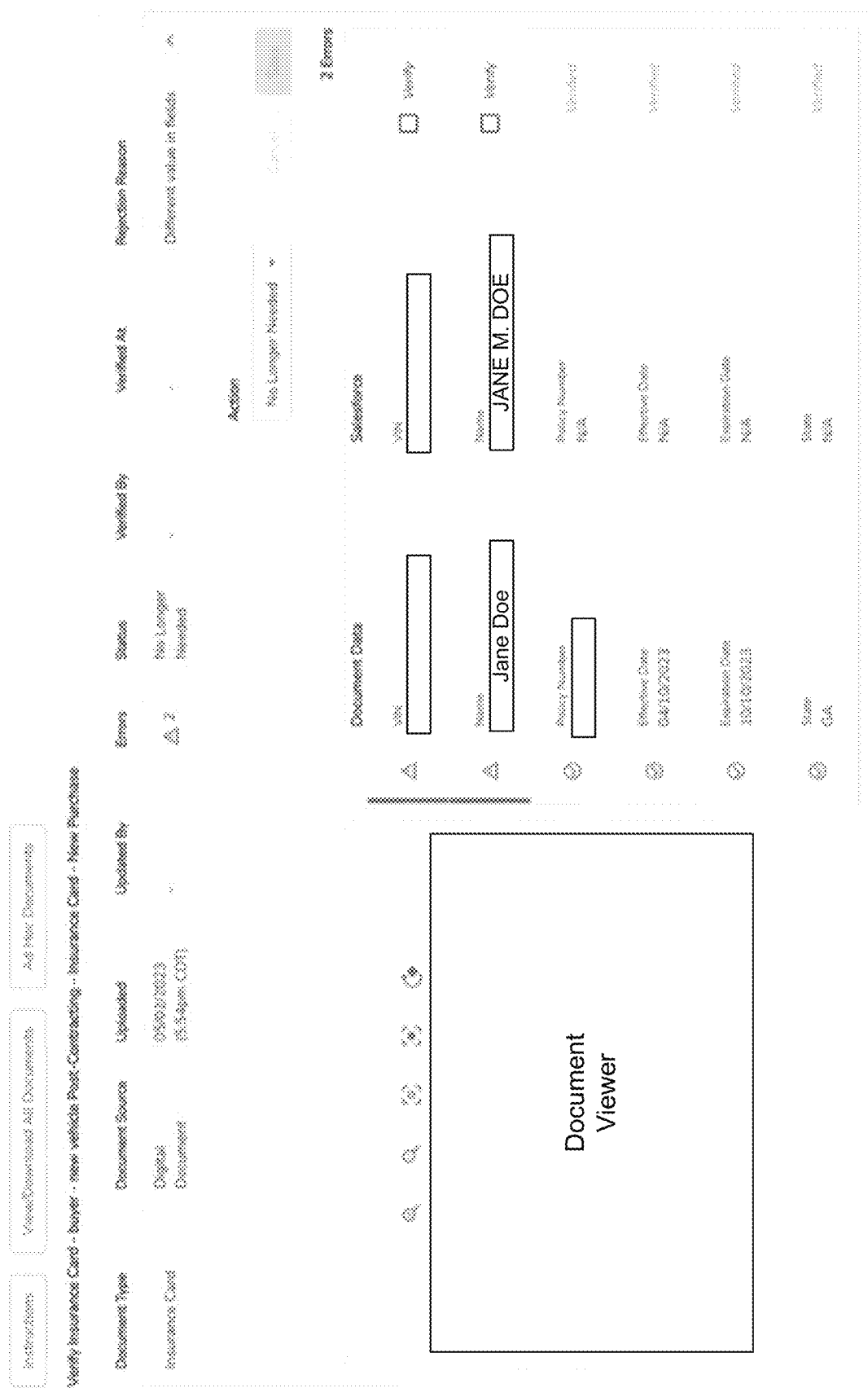
FIG. 4 illustrates an example graphical user interface displaying details associated with a document of interest for a particular transaction, thereby enabling a clerk to perform manual review of source data objects relating to a vehicular interchange in accordance with embodiments of the present technology.

FIG. 4 illustrates an example GUI displaying details associated with a document of interest for a particular transaction, thereby enabling a clerk to perform manual review of source data objects relating to a vehicular interchange in accordance with embodiments of the present technology. The illustrated GUI displays the document (e.g., via an embedded PDF viewer) and extracted data fields that may or may not have been verified in a side-by-side format. During the manual review process, the clerk may manually verify (e.g., by clicking on a checkbox) each data field through the GUI, and save along the process. In some embodiments, the system may allow the clerk to override verifications made by the system during the automatic document quality assurance process. In some embodiments, the system may allow the clerk to view, create, and send notes to other users using the system. In some embodiments, the system may keep a historical log of activity performed by the system and/or the clerk. By combining automatic and manual document quality assurance processes, the computing system can reduce the total review time and reduce costs.

In the illustrated example, errors are shown to indicate that in the scanned or photographed insurance card, the document data pertaining to the VIN and the customer's name do not match the database data corresponding to the same. Some data fields, such as the VIN, may need to be an exact match, so the clerk may view the document to see if the system has correctly extracted the data, and take appropriate measures to either correct or reject the document. In the illustrated example, the names are not an exact match due to a missing middle initial and different capitalization. The clerk may deem such differences to be trivial or otherwise note that both are correct, and verify the data field. Further in the illustrated embodiment, the database column may be missing certain data fields. For example, the jurisdiction (e.g., Georgia state) may not require that the insurance be from any particular jurisdiction, in which case the document data field pertaining to the jurisdiction (i.e., "GA") was automatically verified.

In some embodiments, the computing system may then electronically transmit over the electronic communications network at least one of the electronically retrieved plurality of source data objects to the dynamically selected first remotely connected electronic vehicular authorization database based on the plurality of source data objects, relating to the vehicular interchange, satisfying the first remotely connected electronic vehicular authorization database-specific vehicular interchange requirements.

Computer Systems

Figure 5:
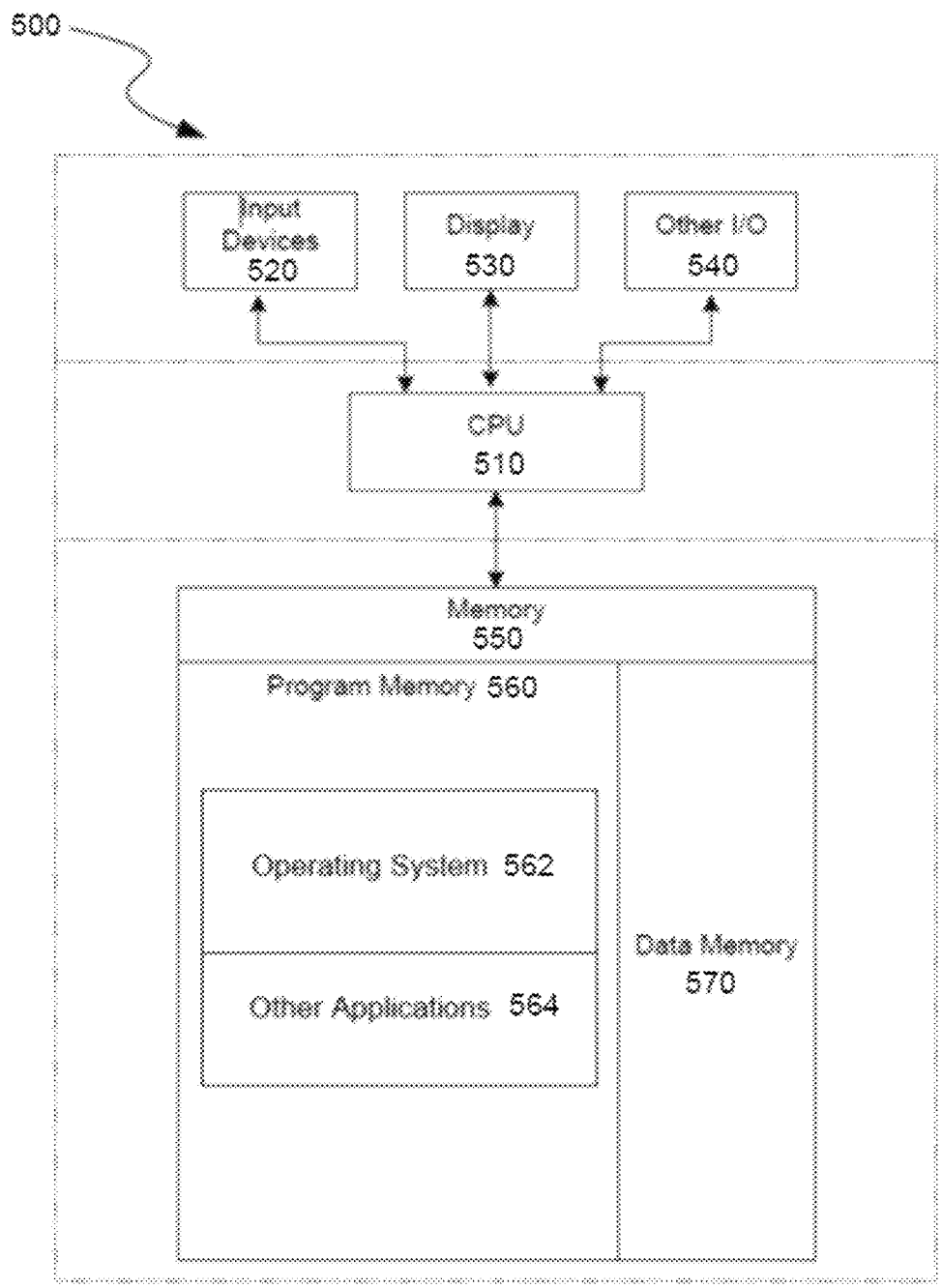
FIG. 5 is a block diagram illustrating an overview of devices on which a computer-implemented self-learning method for dynamically transmitting electronically a registration authorization request based on automatic selection of a remotely connected electronic vehicular authorization database can be performed.

Several implementations are discussed below in more detail in reference to the figures. FIG. 5 is a block diagram illustrating an overview of devices on which a computer-implemented self-learning method for dynamically transmitting electronically a registration authorization request based on automatic selection of a remotely connected electronic vehicular authorization database can be performed. The devices can comprise hardware components of a device 500 with an operating system (OS) 562. Device 500 can include one or more input devices 520, that provide input to the CPU(s) (processor) 510, notifying it of actions. The actions can be mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some implementations, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices include: an LCD display screen, an LED display screen, a projected, holographic, or augmented reality display (such as a heads-up display device or a head-mounted device), and so on. Other I/O devices 540 can also be coupled to the processor, such as a network card, video card, audio card, USB, firewire or other external device, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols, a Q-LAN protocol, or others. Device 500 can utilize the communication device to distribute operations across multiple network devices.

The CPU 510 can have access to a memory 550 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as the OS 562 and other application programs 564. Memory 550 can also include data memory 570 that can include data to be operated on by applications, configuration data, settings, options or preferences, etc., which can be provided to the program memory 560 or any element of the device 500.

Figure 6:
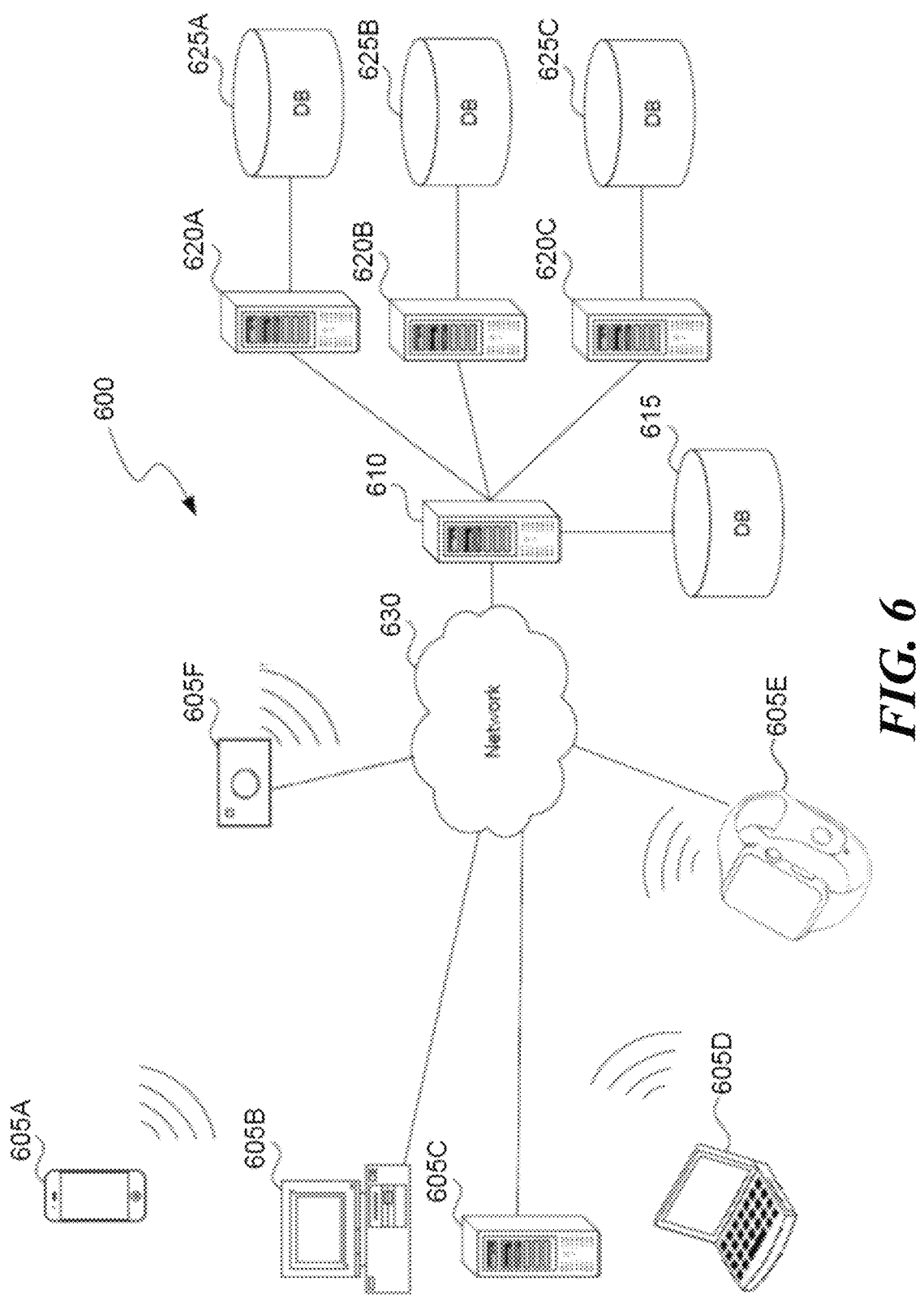
FIG. 6 is a block diagram illustrating an overview of an environment in which a computer-implemented self-learning method for dynamically transmitting electronically a registration authorization request based on automatic selection of a remotely connected electronic vehicular authorization database can be performed.

Some implementations can be operational with numerous other computing system environments or configurations. Examples of computing systems, environments, and/or configurations that may be suitable for use with the technology include, but are not limited to, personal computers, I/O systems, networked peripherals, video conference consoles, server computers, handheld or laptop devices, cellular telephones, wearable electronics, gaming consoles, tablet devices, multiprocessor systems, FIG. 6 is a block diagram illustrating an overview of an environment in which a computer-implemented self-learning method for dynamically transmitting electronically a registration authorization request based on automatic selection of a remotely connected electronic vehicular authorization database can be performed.

Environment 600 can include one or more client computing devices 605A-H, examples of which can include device 100. In the illustrated embodiment, device 605A is a wireless smart phone or tablet, device 605B is a desk-top computer, device 605C is a computer system, device 605D is a wireless laptop, device 605E is a smart watch, and device 605F is a networked camera system. These are only examples of some of the devices, and other embodiments can include other computing devices. Client computing devices 605 can operate in a networked environment using logical connections 610 through network 630 to one or more remote computers, such as a server computing device.

In some implementations, server 610 can be an edge server which receives client requests and coordinates fulfillment of those requests through other servers, such as servers 620A-C. Server computing devices 610 and 620 can comprise computing systems, such as device 100. Though each server computing device 610 and 620 is displayed logically as a single server, server computing devices can each be a distributed computing environment encompassing multiple computing devices located at the same or at geographically disparate physical locations. In some implementations, each server 620 corresponds to a group of servers.

Client computing devices 605 and server computing devices 610 and 620 can each act as a server or client to other server/client devices. Server 610 can connect to a database 615. Servers 620A-C can each connect to a corresponding database 625A-C. As discussed above, each server 620 can correspond to a group of servers, and each of these servers can share a database or can have their own database. Databases 615 and 625 can warehouse (e.g., store) information. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. Portions of network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Additional Embodiments

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example+5%, +10%, +15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

We claim:

1. A computer-implemented self-learning method for dynamically transmitting electronically a registration authorization request based on automatic selection of a remotely connected electronic vehicular authorization database, the computer-implemented self-learning method comprising:

retrieving, by a computing system, a set of rules from a rules database, wherein the set of rules relate to a vehicular interchange;

accessing, by a computing system through an application programming interface (API), an electronic vehicular database to electronically retrieve a plurality of source data objects relating to the vehicular interchange based on the retrieved set of rules;

applying, by the computing system, an optical character recognition algorithm or a computer vision algorithm to the electronically retrieved plurality of source data objects to generate a modified plurality of source data objects;

extracting, by the computing system, a plurality of data fields from the modified plurality of source data objects, wherein the data fields comprise a vehicle identification number of a vehicle;

normalizing, by the computing system, the plurality of extracted data fields from the modified plurality of source data objects using at least one of a universal data representation map and a source data object-specific data representation map;

dynamically selecting, by the computing system, a first remotely connected electronic vehicular authorization database from a plurality of remotely connected electronic vehicular authorization databases to electronically transmit over an electronic communications network at least one of the electronically retrieved plurality of source data objects to the first remotely connected electronic vehicular authorization database, wherein the dynamically selecting is based on at least a number of previously electronically transmitted registration authorization requests to the first remotely connected electronic vehicular authorization database, wherein the number of previously electronically transmitted registration authorization requests is electronically stored in a historical database;

accessing, by the computing system, first remotely connected electronic vehicular authorization database-specific vehicular interchange requirements electronically stored in a vehicular interchange requirements database; and electronically transmitting, by the computing system, over the electronic communications network at least one of the electronically retrieved plurality of source data objects to the dynamically selected first remotely connected electronic vehicular authorization database based on the plurality of source data objects, relating to the vehicular interchange, satisfying the first remotely connected electronic vehicular authorization database-specific vehicular interchange requirements.

2. The computer-implemented self-learning method of claim 1, further comprising:

searching, by the computer system, for missing data fields in the electronically retrieved plurality of source data objects, wherein the missing data fields are based at least on the first remotely connected electronic vehicular authorization database-specific vehicular interchange requirements; and searching, by the computer system, for evidence of title defects, issues, or fraud in the electronically retrieved plurality of source data objects.

3. The computer-implemented self-learning method of claim 1, wherein the dynamically selecting is further based on at least an average vehicular interchange period associated with the first remotely connected electronic vehicular authorization database.

4. The computer-implemented self-learning method of claim 1, wherein the dynamically selecting is further based on at least a reduction in inventory and overhead costs associated with the first remotely connected electronic vehicular authorization database.

5. The computer-implemented self-learning method of claim 1, further comprising:

comparing, by the computer system, the normalized plurality of data fields to a second plurality of data fields, wherein the second plurality of data fields is stored in a second electronic vehicular database.

6. The computer-implemented self-learning method of claim 1, further comprising:

displaying, by the computing system, a list of the modified plurality of source data objects for facilitating manual review of the modified plurality of source data objects by a user; and ordering, by the computer system, the list of the modified plurality of source data objects based on at least a number of data fields that do not satisfy the first remotely connected electronic vehicular authorization database-specific vehicular interchange requirements.

7. The computer-implemented self-learning method of claim 1, further comprising:

classifying, by the computing system, the electronically retrieved plurality of source data objects based on the normalized plurality of data fields.

8. A computer-implemented self-learning method for dynamically transmitting electronically a registration authorization request, the computer-implemented self-learning method comprising:

retrieving, by a computing system, a set of rules from a rules database, wherein the set of rules relate to a vehicular interchange;

accessing, by a computing system, an electronic vehicular database to electronically retrieve a plurality of source data objects relating to the vehicular interchange based on the retrieved set of rules;

applying, by the computing system, an algorithm to the electronically retrieved plurality of source data objects to generate a modified plurality of source data objects;

extracting, by the computing system, a plurality of data fields from the modified plurality of source data objects;

normalizing, by the computing system, the plurality of extracted data fields from the modified plurality of source data objects using at least one of a universal data representation map and a source data object-specific data representation map;

dynamically selecting, by the computing system, a first remotely connected electronic vehicular authorization database from a plurality of remotely connected electronic vehicular authorization databases to electronically transmit over an electronic communications network at least one of the electronically retrieved plurality of source data objects to the first remotely connected electronic vehicular authorization database;

accessing, by the computing system, first remotely connected electronic vehicular authorization database-specific vehicular interchange requirements electronically stored in a vehicular interchange requirements database; and electronically transmitting, by the computing system, over the electronic communications network at least one of the electronically retrieved plurality of source data objects to the dynamically selected first remotely connected electronic vehicular authorization database based on the plurality of source data objects, relating to the vehicular interchange, satisfying the first remotely connected electronic vehicular authorization database-specific vehicular interchange requirements.

9. The computer-implemented self-learning method of claim 8, further comprising:
searching, by the computer system, for missing data fields in the electronically retrieved plurality of source data objects, wherein the missing data fields are based at least on the first remotely connected electronic vehicular authorization database-specific vehicular interchange requirements; and
searching, by the computer system, for evidence of title defects, issues, or fraud in the electronically retrieved plurality of source data objects.

10. The computer-implemented self-learning method of claim 8, wherein the dynamically selecting is further based on at least an average vehicular interchange period associated with the first remotely connected electronic vehicular authorization database.

11. The computer-implemented self-learning method of claim 8, wherein the dynamically selecting is further based on at least a reduction in inventory and overhead costs associated with the first remotely connected electronic vehicular authorization database.

12. The computer-implemented self-learning method of claim 8, further comprising:
comparing, by the computer system, the normalized plurality of data fields to a second plurality of data fields, wherein the second plurality of data fields is stored in a second electronic vehicular database.

13. The computer-implemented self-learning method of claim 8, further comprising:
displaying, by the computing system, a list of the modified plurality of source data objects for facilitating manual review of the modified plurality of source data objects by a user; and
ordering, by the computer system, the list of the modified plurality of source data objects based on at least a number of data fields that do not satisfy the first remotely connected electronic vehicular authorization database-specific vehicular interchange requirements.

14. The computer-implemented self-learning method of claim 8, further comprising:
classifying, by the computing system, the electronically retrieved plurality of source data objects based on the normalized plurality of data fields.

15. A non-transitory computer-readable medium storing instructions for a computer-implemented self-learning method for dynamically transmitting electronically a registration authorization request based on automatic selection of a remotely connected electronic vehicular authorization database, the computer-implemented self-learning method comprising:
retrieving, by a computing system, a set of rules from a rules database, wherein the set of rules relate to a vehicular interchange;
accessing, by a computing system through an application programming interface (API), an electronic vehicular database to electronically retrieve a plurality of source data objects relating to the vehicular interchange based on the retrieved set of rules;
applying, by the computing system, an optical character recognition algorithm or a computer vision algorithm to the electronically retrieved plurality of source data objects to generate a modified plurality of source data objects;
extracting, by the computing system, a plurality of data fields from the modified plurality of source data objects, wherein the data fields comprise a vehicle identification number of a vehicle;
normalizing, by the computing system, the plurality of extracted data fields from the modified plurality of source data objects using at least one of a universal data representation map and a source data object-specific data representation map;
dynamically selecting, by the computing system, a first remotely connected electronic vehicular authorization database from a plurality of remotely connected electronic vehicular authorization databases to electronically transmit over an electronic communications network at least one of the electronically retrieved plurality of source data objects to the first remotely connected electronic vehicular authorization database, wherein the dynamically selecting is based on at least a number of previously electronically transmitted registration authorization requests to the first remotely connected electronic vehicular authorization database, wherein the number of previously electronically transmitted registration authorization requests is electronically stored in a historical database;
accessing, by the computing system, first remotely connected electronic vehicular authorization database-specific vehicular interchange requirements electronically stored in a vehicular interchange requirements database; and
electronically transmitting, by the computing system, over the electronic communications network at least one of the electronically retrieved plurality of source data objects to the dynamically selected first remotely connected electronic vehicular authorization database based on the plurality of source data objects, relating to the vehicular interchange, satisfying the first remotely connected electronic vehicular authorization database-specific vehicular interchange requirements.

16. The non-transitory computer-readable medium of claim 15, further comprising:
searching, by the computer system, for missing data fields in the electronically retrieved plurality of source data objects, wherein the missing data fields are based at least on the first remotely connected electronic vehicular authorization database-specific vehicular interchange requirements; and
searching, by the computer system, for evidence of fraud in the electronically retrieved plurality of source data objects.

17. The non-transitory computer-readable medium of claim 15, wherein the dynamically selecting is further based on at least an average vehicular interchange period associated with the first remotely connected electronic vehicular authorization database.

18. The non-transitory computer-readable medium of claim 15, wherein the dynamically selecting is further based on at least a reduction in inventory and overhead costs associated with the first remotely connected electronic vehicular authorization database.

19. The non-transitory computer-readable medium of claim 15, further comprising:
comparing, by the computer system, the normalized plurality of data fields to a second plurality of data fields, wherein the second plurality of data fields is stored in a second electronic vehicular database.

20. The non-transitory computer-readable medium of claim 15, further comprising:

displaying, by the computing system, a list of the modified plurality of source data objects for facilitating manual review of the modified plurality of source data objects by a user; and ordering, by the computer system, the list of the modified plurality of source data objects based on at least a number of data fields that do not satisfy the first remotely connected electronic vehicular authorization database-specific vehicular interchange requirements.

* * * * *